United States Patent Office 3,015,679
Patented Jan. 2, 1962

3,015,679
PRODUCTION OF DICHLORBUTENES
Frederick James Bellringer, Leatherhead, England, assignor to The Distillers Company Limited, Edinburgh, Scotland, a British company
No Drawing. Filed June 23, 1959, Ser. No. 822,184
Claims priority, application Great Britain July 11, 1958
12 Claims. (Cl. 260—652.5)

The present invention relates to the stabilisation of 3:4-dichlorbutene-1.

It is well known to produce 3:4-dichlorbutene-1 from 1:4-dichlorbutene-2 by isomerisation in the presence of catalysts, and distilling off the 3:4-dichlorbutene-1, which is of lower boiling point than 1:4-dichlorbuene-2. This isomerisation is reversible, and hitherto, difficulties have been experienced due to the partial reversion of the 3:4-dichlorbutene-1 to 1:4-dichlorbutene-2. This reversion occurs in the still-head and lines leading to the collecting vessel, and also on storage after collection. The reversion is believed to be catalysed by traces of iron and other metals as well as copper picked up from the distillation apparatus and storage vessels, and is serious in that it involves a loss of yield of 3:4-dichlorbutene-1. Similar reversion occurs if the distillate of 3:4-dichlorbutene-1 is subsequently purified by distilling off lower boiling compounds.

According to the present invention, the process for stabilisation of 3:4-dichlorbutene-1 comprises incorporating with the 3:4 dichlorbutene-1 one or more organic sulphur compounds of the kind described below.

The invention also comprises 3:4-dichlorbutene-1 stabilised by one or more organic sulphur compounds of the kind described.

The organic sulphur compounds, hereinafter referred to as inhibitors, which may be used in the process of the present invention are those compounds having a divalent sulphur atom attached by one of its valencies to a carbon atom, and attached by the second of its valencies to a carbon atom or to a hydrogen atom. Suitable compounds covered by this definition include mercaptans such as methyl, ethyl, propyl, isoproyl, butyl, amyl, hexyl, dodecyl and benzyl mercaptans, substituted mercaptans such as thioglycollic acid and mercaptobenzothiazole, and compounds such as thiodiphenylamine.

The concentration of added inhibitor is not critical and may vary within wide limits, depending on the amount of trace metal present. In general concentrations of inhibitor between 0.01 and 1% by weight, based on the dichlorbutene, are suitable.

The process of stabilising the 3:4-dichlorbutene-1 according to the present invention may be applied to the production of 3:4-dichlorbutene-1 by the isomerisation of 1:4-dichlorbutene-2, followed by the distillation of the 3:4-dichlorbutene-1 out of the reaction mixture.

The isomerisation may be carried out in any suitable manner, for instance by contacting the 1:4-dichlorbutene-2 with a copper catalyst, such as cuprous or cupric chloride, at the boiling point temperature of 3:4-dichlorbutene-1 and distilling the 3:4-dichlorbutene-1 out of the reaction mixture as it is formed in the presence of the inhibitor, which is suitably added to the still head. It is preferred to use an inhibitor having a boiling point the same as or lower than the boiling point of 3:4-dichlorbutene-1, for instance isopropylmercaptan, so that this is taken over with the 3:4-dichlorbutene-1 as it is condensed and collected, thereby eliminating reversion to 1:4-dichlorbutene-2 in the still head and collecting lines, as well as in the storage tank.

The organic sulphur compounds may be added to the distillation as such, or preferably in the form of a solution in the dichlorbutene itself or an inert solvent such as xylene.

On the other hand, if it is subsequently desired to purify the distillate of 3:4-dichlorbutene-1 by distilling off lower boiling impurities, this is preferably carried out in the presence of an inhibitor such as dodecyl mercaptan, benzyl mercaptan, thio-diphenylamine or mercaptobenzothiazole, having a boiling point the same as or higher than that of 3:4-dichlorbutene-1.

The inhibitor may also be added to the vessels in which the 3:4-dichlorbutene-1 is collected and stored.

The following examples are given further to illustrate the process of the invention.

EXAMPLE 1

A quantity of dichlorbutenes contained by analysis 97.2% of 3:4-dichlorbutene-1 and 1.2% of 1:4-dichlorbutene-2. Equal volumes of this dichlorbutene were placed in two glass storage vessels, A, and B. To both vessels 0.05% of ferric chloride was added; to vessel A, 0.02% of thiodiphenylamine was also added; and to vessel B, 0.1% of thioglycollic acid was added. The ferric chloride was added to simulate the effect on the dichlorbutenes of storage in steel vessels. After storing for 2 months, the contents of the flasks were analysed and the results are shown in Table 1. Substantially no reversion of 3:4-dichlorbutene-1 to 1:4-dichlorbutene-2 took place.

By way of comparison with this example, the same quantity of 3:4-dichlorbutene-1 was stored in two further glass storage vessels, C and D; to vessel D was also added 0.05% of ferric chloride. The results shown in Table 1 demonstrate the catalytic effect of iron on the reversion of 3:4-dichlorbutene-1 to 1:4-dichlorbutene-2, which takes place in the absence of an inhibitor.

Table 1

| Flask | Additives | Initial 3:4-dichlorbutene-1 assay, percent | Final 3:4-dichlorbutene-1 assay, percent |
| --- | --- | --- | --- |
| A | 0.05% $FeCl_3$+0.2% thiodiphenylamine. | 97.2 | 97.0 |
| B | 0.05% $FeCl_3$+0.1% thioglycollic acid. | 97.2 | 96.5 |
| C | Nil | 97.2 | 97.2 |
| D | 0.05% $FeCl_3$ | 97.2 | 88.7 |

EXAMPLE 2

A mixture of dichlorbutenes, obtained by the additive chlorination of butadiene containing approximately equal proportions of 1:4-dichlorbutene-2 and 3:4-dichlorbutene-1, is isomerised to the 3:4-isomer by heating in the kettle of a still with a copper catalyst, and distilling off the 3:4-dichlorbutene-1 as it is formed. A solution of butyl mercaptan in 3:4-dichlorbutene-1 is also added to the head of the still to give about 50 parts of mercaptan per million parts of dichlorbutene feed. The distillate of 3:4-dichlorbutene-1, which contains small amounts of 1-chlorbutadiene and other low-boiling impurities, is fed continuously to a stainless steel distillation column, from the head of which low-boiling impurities are continuously removed and from the base of which 3:4-dichlorbutene-1 free from low-boiling compounds is withdrawn. 0.1% each of butyl mercaptan and thio-diphenylamine are also added to the feed to the column.

The 3:4-dichlorbutene-1 withdrawn from the base of the column contains only about 0.2% of 1:4-dichlorbutene-2.

EXAMPLE 3

A sample of crude 3:4-dichlorbutene-1 obtained by isomerisation of a mixture of dichlorbutenes as described in Example 2 was fed to a stainless steel distillation column for the removal of lower boiling impurities. A solution of isopropyl mercaptan and benzyl mercaptan in 3:4-dichlorbutene-1 was also fed to the still at a rate to give about 50 parts of each inhibitor per million of dichlorbutene in the still. The lower-boiling impurities together with most of the isopropyl mercaptan were taken off overhead, and from the base of the still the 3:4-dichlorbutene-1 containing the benzyl mercaptan was pumped to a mild steel storage tank.

After 15 days' storage analysis of the contents of the tank showed that substantially no reversion to 1:4-dichlorbutene-2 had taken place.

By way of comparison with this example a further sample of 3:4-dichlorbutene-1, obtained by isomerisation and containing 93.9% of 3:4-dichlorbutene-1, 5.0% of 1-chlorbutadiene, and 1.1% of 1:4-dichlorbutene-2, was stored in a mild steel tank.

After 4 days the amount of 1:4-dichlorbutene-2 had increased to 2.8%, and analysis showed the presence of 140 p.p.m. of iron in the tank contents.

I claim:
1. 3:4-dichlorbutene-1 stabilized against metal-induced reversion to 1.4-dichlorbutene-2, by at least one organic sulphur compound containing a divalent sulphur atom attached by one of its valencies to a carbon atom and attached by the second of its valencies to an atom selected from the group consisting of carbon and hydrogen atoms.

2. Stabilized 3:4-dichlorbutene-1 as claimed in claim 1 wherein the organic sulphur compound is selected from the group consisting of methyl, ethyl, propyl, isopropyl, butyl, amyl, hexyl, dodecyl and benzyl mercaptans, thioglycollic acid, mercaptobenzothiazole, and thio-diphenylamine.

3. Stabilized 3:4-dichlorbutene-1 as claimed in claim 1 wherein the concentration of organic sulphur compound is between 0.01 and 1% by weight, based on the weight of dichlorbutene.

4. A process for the production of 3:4-dichlorbutene-1 by the isomerisation of 1:4-dichlorbutene-2 and distillation of the resulting mixture to recover the 3:4-dichlorbutene-1 as it is formed, which comprises carrying out the distillation of the 3:4-dichlorbutene-1 in the presence of at least one organic sulphur compound as an inhibitor against metal-induced reversion to 1:4-dichlorbutene-2, containing a divalent sulphur atom attached by one of its valencies to a carbon atom, and attached by the second of its valencies to an atom selected from the group consisting of carbon and hydrogen atoms.

5. The process as claimed in claim 4 wherein the organic sulphur compound has a boiling point the same as or lower than the boiling point of 3:4-dichlorbutene-1.

6. The process as claimed in claim 5 wherein the organic sulphur compound is isopropyl mercaptan.

7. A process for the purification of 3:4-dichlorbutene-1 containing lower boiling impurities which comprises fractionally distilling the 3:4-dichlorbutene-1 in the presence of at least one organic sulphur compound as an inhibitor against metal-induced reversion to 1:4-dichlorbutene-2, said compound containing a divalent sulphur atom attached by one of its valencies to a carbon atom, and attached by the second of its valencies to an atom selected from the group consisting of carbon and hydrogen atoms, said compound having a boiling point the same as or higher than the boiling point of 3:4-dichlorbutene-1, and taking off the lower boiling impurities as an overhead fraction.

8. The process as claimed in claim 7 wherein the organic sulphur compound is selected from the group consisting of dodecyl mercaptan, benzyl mercaptan, mercaptobenzothiazole and thio-diphenylamine.

9. A process for inhibiting back-isomerization of 3:4-dichlorbutene-1 to 1:4-dichlorbutene-2 during distillation which comprises distilling 3:4-dichlorbutene-1 in the presence of at least one organic sulphur compound selected from the group consisting of methyl, ethyl, propyl, isopropyl, butyl, amyl, hexyl, dodecyl, and benzyl mercaptans, thioglycollic acid, mercaptobenzothiazole, and thio-diphenylamine.

10. A process for the stabilization of 3:4-dichlorbutene-1 which comprises incorporating therewith at least one organic sulphur compound as an inhibitor against metal-induced reversion to 1:4-dichlorbutene-2, said compound containing a divalent sulphur atom attached by one of its valencies to a carbon atom, and attached by the second of its valencies to an atom selected from the group consisting of carbon and hydrogen atoms.

11. 3:4-dichlorbutene-1 stabilized in the presence of copper against reversion to 1:4-dichlorbutene-2 by at least one organic sulphur compound containing a divalent sulphur atom attached by one of its valencies to a carbon atom and attached to the second of its valencies to an atom selected from the group consisting of carbon and hydrogen atoms.

12. 3:4-dichlorbutene-1 stabilized in the presence of iron against reversion to 1:4-dichlorbutene-2 by at least one organic sulphur compound containing a divalent sulphur atom attached by one of its valencies to a carbon atom and attached by the second of its valencies to an atom selected from the group consisting of carbon and hydrogen atoms.

References Cited in the file of this patent

UNITED STATES PATENTS

| | | |
|---|---|---|
| 1,950,438 | Carothers et al. | Mar. 13, 1934 |
| 2,136,334 | Coleman et al. | Nov. 8, 1938 |
| 2,376,075 | Morris et al. | May 15, 1945 |
| 2,407,149 | Cardenier | Sept. 3, 1946 |
| 2,407,396 | Brubaker | Sept. 10, 1946 |
| 2,407,405 | Dietrich et al. | Sept. 10, 1946 |
| 2,422,252 | Otto | June 17, 1947 |